United States Patent [19]
Saito et al.

[11] Patent Number: 6,153,710
[45] Date of Patent: Nov. 28, 2000

[54] PREACTIVATED CATALYST FOR OLEFIN (CO)POLYMER, CATALYST FOR OLEFIN (CO)POLYMERIZATION, OLEFIN (CO) POLYMER COMPOSITION, AND PROCESS FOR PRODUCING THE SAME

[75] Inventors: Jun Saito; Shingo Kikukawa; Tsutomu Ushioda; Akiko Kageyama; Mototake Tsutsui, all of Chiba, Japan

[73] Assignee: Chisso Corporation, Osaka, Japan

[21] Appl. No.: 09/155,189

[22] PCT Filed: Feb. 9, 1998

[86] PCT No.: PCT/JP98/00534

§ 371 Date: Sep. 22, 1998

§ 102(e) Date: Sep. 22, 1998

[87] PCT Pub. No.: WO98/35997

PCT Pub. Date: Aug. 20, 1998

[30] Foreign Application Priority Data

Feb. 18, 1997 [JP] Japan .................................. 9-34011
Feb. 18, 1997 [JP] Japan .................................. 9-34012

[51] Int. Cl.$^7$ .......................... C08F 2/00; C08L 23/16; B01J 31/06

[52] U.S. Cl. .......................... 526/75; 526/86; 526/87; 526/160; 526/133; 526/351; 526/352; 526/904; 526/943; 502/104; 502/117; 502/152; 525/240; 525/247

[58] Field of Search .................... 525/240, 247; 526/160, 348.6, 351, 352, 943, 904, 75, 86, 87, 133; 502/104, 117, 152

[56] References Cited

U.S. PATENT DOCUMENTS

3,808,206  4/1974  Fleming et al. .
4,460,757  7/1984  Sato et al. .
4,923,935  5/1990  Sano et al. .
5,047,485  9/1991  DeNicola, Jr. .

(List continued on next page.)

FOREIGN PATENT DOCUMENTS

0 315 481   5/1989  European Pat. Off. .
0 398 350  11/1990  European Pat. Off. .
0 534 119   3/1993  European Pat. Off. .

(List continued on next page.)

OTHER PUBLICATIONS

Kaminsky, "Metallocene Catalysts", SP'92–Polyethylene World Congress, Zurich Switzerland, Dec. 7–Sep. 1992.

Takaya MISE et al., "Excellent Stereoregular Isotactic Polymerizations of Propylene with $C_2$–Symmetric Silylene–Bridged Metallocene Catalysts" *Chemistry Letters,* pp. 1853–1856.

Walter Spaleck et al., "The Influence of Aromatic Substituents on the Polymerization Behavior of Bridged Zirconocene Catalysts" *Organometallics,* vol. 13, No. 3 (American Chemical Society), pp. 954–963.

A. Zambelli, et al., Model Compounds and C NMR Observation of Stereosequences of Polypropylene, pp. 687–689, Macromolecules vol. 8, No. 5.

A. Zambelli, et al., Carbon–13 Observations of the Stereochemical Configuration of Polypropylene, pp. 925–926, Macromolecules vol. 6, No. 6.

*Primary Examiner*—David W. Wu
*Assistant Examiner*—R. Harlan
*Attorney, Agent, or Firm*—Merchant & Gould P.C.

[57] ABSTRACT

An olefin (co)polymer composition comprising, as major components, (a) 0.01 to 5 parts by weight of an olefin (co)polymer having an intrinsic viscosity $[\eta_a]$ as measured in 135° C. tetralin of 15 to 100 dl/g and (b) 100 parts by weight of an olefin (co)polymer obtained by using a metallocene catalyst and having an intrinsic viscosity $[\eta_b]$ as measured in 135° C. tetralin of 0.2 to 10 dl/g. When polyethylene having a high degree of polymerization is produced before a so-called metallocene catalyst is used to polymerize, e.g., propylene in the presence of the polyethylene as a component of a catalyst composition, a polypropylene composition having a high melt tension and a high crystallization temperature is produced.

19 Claims, 1 Drawing Sheet

(A) Transition Metal Component

Transition metal compound having at least one π electron conjugated ligand (B) Organic Metal Component
at least one compound selected from aluminoxane, an ionic compound and a Lewis acid.

(Organic aluminum compound)

Preactivation Treatment olefin
Intrinsic viscosity: 15dl/g to 100dl/g
1g to 500kg/mmol of transition metal Main (co)polymerization olefin

U.S. PATENT DOCUMENTS

| | | |
|---|---|---|
| 5,155,080 | 10/1992 | Elder et al. . |
| 5,252,529 | 10/1993 | Ueda et al. . |
| 5,260,384 | 11/1993 | Morimoto et al. . |
| 5,280,384 | 1/1994 | Morimoto et al. . |
| 5,382,631 | 1/1995 | Stehling et al. . |
| 5,387,568 | 2/1995 | Ewen et al. . |
| 5,494,982 | 2/1996 | Nakacho et al. . |
| 5,519,100 | 5/1996 | Ewen et al. . |
| 5,539,067 | 7/1996 | Parodi et al. . |
| 5,561,092 | 10/1996 | Ewen et al. . |
| 5,614,457 | 3/1997 | Ewen et al. . |
| 5,629,254 | 5/1997 | Fukoka et al. ............... 502/117 |
| 5,663,249 | 9/1997 | Ewen et al. . |
| 5,854,354 | 12/1998 | Ueda et al. ............... 525/322 |
| 6,004,897 | 12/1999 | Imuta et al. ............... 502/103 |

FOREIGN PATENT DOCUMENTS

| | | |
|---|---|---|
| 0 536 503 | 4/1993 | European Pat. Off. . |
| 0 538 749 | 4/1993 | European Pat. Off. . |
| 0 579 510 | 1/1994 | European Pat. Off. . |
| 0 580 033 | 1/1994 | European Pat. Off. . |
| 0 714 923 | 6/1996 | European Pat. Off. . |
| 0 856 526 | 8/1998 | European Pat. Off. . |
| 0 864 589 | 9/1998 | European Pat. Off. . |
| 32 46 447 | 7/1983 | Germany . |
| 52-136247 | 11/1977 | Japan . |
| 53-91954 | 8/1978 | Japan . |
| 55-123637 | 9/1980 | Japan . |
| 56-3356 | 1/1981 | Japan . |
| 56-110707 | 9/1981 | Japan . |
| 57-31945 | 2/1982 | Japan . |
| 57-63310 | 4/1982 | Japan . |
| 57-63311 | 4/1982 | Japan . |
| 57-65738 | 4/1982 | Japan . |
| 58-17104 | 2/1983 | Japan . |
| 58-83006 | 5/1983 | Japan . |
| 58-138712 | 8/1983 | Japan . |
| 60-81211 | 5/1985 | Japan . |
| 61-130310 | 6/1986 | Japan . |
| 61-152754 | 7/1986 | Japan . |
| 62-25106 | 2/1987 | Japan . |
| 62-104810 | 5/1987 | Japan . |
| 62-104811 | 5/1987 | Japan . |
| 62-104812 | 5/1987 | Japan . |
| 63-12606 | 1/1988 | Japan . |
| 2-298536 | 12/1990 | Japan . |
| 2-305811 | 12/1990 | Japan . |
| 3-12406 | 1/1991 | Japan . |
| 3-12407 | 1/1991 | Japan . |
| 3-50239 | 3/1991 | Japan . |
| 4-055410 | 2/1992 | Japan . |
| 5-65373 | 3/1993 | Japan . |
| 5-140224 | 6/1993 | Japan . |
| 5-222122 | 8/1993 | Japan . |
| 5-255436 | 10/1993 | Japan . |
| 5-255437 | 10/1993 | Japan . |
| 59-93711 | 5/1994 | Japan . |
| 6-206923 | 7/1994 | Japan . |
| 6-206939 | 7/1994 | Japan . |
| 6-234812 | 8/1994 | Japan . |
| 7-188317 | 7/1995 | Japan . |
| 7-188336 | 7/1995 | Japan . |
| 7-238114 | 9/1995 | Japan . |
| 8-217816 | 8/1996 | Japan . |
| 10-17736 | 1/1998 | Japan . |
| WO88/05792 | 8/1988 | WIPO . |
| WO88/05793 | 8/1988 | WIPO . |
| WO 94/28034 | 12/1994 | WIPO . |

PREACTIVATED CATALYST FOR OLEFIN (CO)POLYMER, CATALYST FOR OLEFIN (CO)POLYMERIZATION, OLEFIN (CO) POLYMER COMPOSITION, AND PROCESS FOR PRODUCING THE SAME

TECHNICAL FIELD

The present invention relates to a preactivated catalyst for olefin (co)polymerization that can produce an olefin (co) polymer having a high melt tension, a high crystallization temperature and excellent heat stability, and a catalyst for olefin (co)polymerization. The present invention also relates to an olefin (co)polymer composition having a high melt tension, a high crystallization temperature and excellent heat stability, and a method for producing the same.

BACKGROUND ART

Olefin (co)polymers such as polypropylene and polyethylene are widely used in a variety of molding fields because of their excellent mechanical properties, chemical resistance and cost-effectiveness. Conventionally, the olefin (co) polymers generally have been produced by (co) polymerizing olefin by using a so-called Ziegler-Natta catalyst, which is obtained by combining titanium trichloride or titanium tetrachloride, or a transition metal catalyst component comprising titanium trichloride or titanium tetrachloride supported by a carrier such as magnesium chloride, and an organic aluminum compound.

In recent years, on the other hand, a catalyst that is obtained by combining metallocene and aluminoxane, which is different from catalysts in the prior art, is used to (co)polymerize olefins to obtain olefin (co)polymers. The olefin (co)polymer obtained by using the metallocene-based catalyst has a narrow molecular weight distribution, and in the case of copolymers, comonomers are copolymerized uniformly. Therefore, it is known that more homogeneous olefin (co)polymers can be obtained than in the prior art. However, compared with olefin (co)polymers obtained by using a conventional catalyst type, the olefin (co)polymers obtained by using the metallocene-based catalyst have a lower melt tension, so that they are not suitable for some uses.

In order to enhance the melt tension and the crystallization temperature of polypropylene, the following methods have been proposed: a method of reacting polypropylene with an organic peroxide and a crosslinking assistant in a molten state (Japanese Laid-Open Patent Publication (Tokkai-Sho) Nos. 59-93711, 61-152754); and a method for producing gel-free polypropylene with free-end long chain branching by reacting semi-crystalline polypropylene with a peroxide having a low decomposition temperature in the absence of oxygen (Japanese Laid-Open Patent Publication (Ibkkai-Hei) No.2-298536).

Other methods for enhancing melting viscoelasticity such as melt tension have been proposed, such as a method of using a composition comprising polyethylenes or polypropylenes having different intrinsic viscosities or molecular weights, or producing such compositions by multistage polymerization.

Examples of such a method include a method in which 2 to 30 parts by weight of ultra high molecular weight polypropylene are added to 100 parts by weight of ordinary polypropylene and extrusion is performed in a temperature range from a melting point to 210° C. (Japanese Patent Publication (kko-Sho) No. 61-28694), a method using multistage polymerization to obtain an extrusion sheet formed of two components of polypropylene having different molecular weights and a limiting viscosity ratio of at least 2 (Japanese Patent Publication (Ibkko-Hei) No. 1-12770), a method of producing a polyethylene composition formed of three types of polyethylene having different viscosity average molecular weights comprising 1 to 10 wt % of high viscosity average molecular weight polyethylene by melting and kneading or multistage polymerization (Japanese Patent Publication (Ibkko-Sho) No. 62-61057), a method for polymerizing polyethylene in which ultra high molecular weight polyethylene having an intrinsic viscosity of 20 dl/g or more is polymerized in an amount of 0.05 or more and less than 1 wt % by multistage polymerization with highly active titanium vanadium solid catalyst component (Japanese Patent Publication (Iokko-Hei) No. 5-79683), and a method for polymerizing polyethylene in which 0.1 to 5 wt % of ultra high molecular weight polyethylene having an intrinsic viscosity of 15 dl/g or more is polymerized by multistage polymerization in a specially arranged polymerization reactor by using a highly active titanium catalyst component preliminarily polymerized with 1-butene or 4-methyl-1-pentene (Japanese Patent Publication (Ibkko-Hei) No. 7-8890).

Furthermore, Japanese Laid-Open Patent Publication (Ibkkai-Hei) No. 5-222122 has disclosed a method for producing polypropylene having a high melt tension by polymerizing propylene by using a preliminarily polymerized catalyst obtained by preliminarily polymerizing ethylene and a polyene compound with a supported titanium-containing solid catalyst component and an organic aluminum compound catalyst component. Japanese Laid-Open Patent Publication (Tokkai-Hei) No. 4-55410 has disclosed a method for producing linear low density polyethylene (LLDPE) having a high melt tension by using a preliminarily polymerized catalyst containing polyethylene having a limiting viscosity of 20 dl/g or more obtained by preliminarily polymerizing ethylene alone with the same catalyst components as above.

Furthermore, the following methods have been proposed in order to enhance a melt tension in the case where a metallocene catalyst type is used: a method of using a catalyst comprising a silica carrier containing at least 1.0 wt % of water, a metallocene, methylaluminoxane and triisobutyl aluminum (Japanese Laid-Open Patent Publication (Tbkkai-Hei) No. 5-140224); a method of using two types of metallocene as catalyst components (Japanese Laid-Open Patent Publication (Tbkkai-Hei) Nos. 5-255436, 5-255437 and 6-206939); and a method of using montmorillonite as a metallocene catalyst type (Japanese Laid-Open Patent Publication (Ibkkai-Hei) Nos. 7-188317 and 7-188336).

In the various proposed compositions and the production methods thereof in connection with the conventional catalyst types, the melt tension of the polyolefin is enhanced to some extent under measurement conditions at 190° C. However, other problems still remain unsolved with respect to the improvement of the melt tension under use conditions at 200° C. or more, a residual odor caused by the crosslinking assistant, the crystallization temperature, the heat stability of properties other than the melt tension, or the like.

Furthermore, although the proposed methods in connection with the metallocene catalyst type provide an improvement of the melt tension of polyolefin under measurement conditions at 190° C., it is still desired to improve the melt tension under use conditions at 200° C. or more.

DISCLOSURE OF INVENTION

As evident from the above discussion, it is an object of the present invention to provide a preactivated catalyst for olefin (co)polymerization and a catalyst for olefin (co) polymerization that can produce an olefin (co)polymer having a high melt tension, a high crystallization temperature and excellent heat stability when (co)polymerizing olefins with a metallocene type catalyst. It is another object to provide an olefin (co)polymer composition having a high melt tension, a high crystallization temperature and excellent heat stability, and a method for producing the same.

As a result of ardent research to achieve the objects, the inventors discovered that an olefin (co)polymer composition having a high melt tension at a high temperature and a high crystallization temperature can be obtained by (co) polymerizing olefins with a preactivated catalyst obtained by preactivation in which olefins are (co)polymerized with a metallocene-based catalyst for olefin (co)polymerization so as to produce a small amount of olefin (co)polymer having a specific intrinsic viscosity prior to the main (co) polymerization.

In order to achieve the above-mentioned objects, a preactivated catalyst for olefin (co)polymerization of the present invention is a preactivated catalyst (1) obtained by (co)polymerizing olefins with the following compounds (A) and (B) so that an olefin (co)polymer (a) having an intrinsic viscosity $[\eta_a]$ measured in tetralin at 135° C. of 15 to 100 dl/g is generated in an amount of 1 g to 500 kg per mmol of transition metal in a compound (A):

compound (A): a transition metal compound having at least one π electron conjugated ligand; and compound (B): at least one compound selected from the group consisting of (B-1) aluminoxane, (B-2) an ionic compound that reacts with the transition metal compound (A) so as to form an ionic complex, and (B-3) a Lewis acid.

The preactivated catalyst for olefin (co)polymerization may further comprise a compound (C): an organic aluminum compound, in addition to the compounds (A) and (B).

The preactivated catalyst for olefin (co)polymerization of the present invention is a preactivated catalyst (2) according to the preactivated catalyst (1) obtained by (co)polymerizing olefins so that an olefin (co)polymer (aa) having an intrinsic viscosity $[\eta_{aa}]$ lower than the intrinsic viscosity $[\eta_a]$ of the olefin (co)polymer (a) is generated in an amount of 1 g to 50 kg per mol of transition metal in a compound (A), before, or before and after, the generation of the olefin (co)polymer (a).

In the preactivated catalyst for olefin (co)polymerization, the olefin (co)polymer (aa) is preferably a propylene homopolymer or a propylene-olefin copolymer comprising at least 50 wt % of propylene polymerization units.

In the preactivated catalyst for olefin (co)polymerization, the olefin (co)polymer (a) is preferably an ethylene homopolymer or an ethylene-olefin copolymer comprising at least 50 wt % of ethylene polymerization units.

In the preactivated catalyst for olefin (co)polymerization, most preferably, the olefin (co)polymer (aa) is a propylene homopolymer or a propylene-olefin copolymer comprising at least 50 wt % of propylene polymerization units, the olefin (co)polymer (a) is an ethylene homopolymer or an ethylene-olefin copolymer comprising at least 50 wt % of ethylene polymerization units, and the preactivated catalyst is a preactivated catalyst for propylene (co)polymerization.

Next, a catalyst for olefin (co)polymerization of the present invention comprises [1] a preactivated catalyst obtained by combining the following compounds (A) and (B) or the following compounds (A), (B) and (C) and (co)polymerizing olefins with this mixture so that an olefin (co)polymer (a) having an intrinsic viscosity $[\eta_a]$ measured in tetralin at 135° C. of 15 to 100 dl/g is generated in an amount of 1 g to 500 kg per mmol of transition metal in a compound (A); and [2] at least one compound selected from the group consisting of the following compounds (B) and (C):

compound (A): a transition metal compound having at least one π electron conjugated ligand;

compound (B): at least one compound selected from the group consisting of (B-1) aluminoxane, (B-2) an ionic compound that reacts with the transition metal compound (A) so as to form an ionic complex, and (B-3) a Lewis acid; and compound (C): an organic aluminum compound.

The above-described catalyst is preferably obtained by (co)polymerizing olefins so that an olefin (co)polymer (aa) having an intrinsic viscosity $[\eta_{aa}]$ lower than the intrinsic viscosity $[\eta_a]$ of the olefin (co)polymer (a) is generated in an amount of 1 g to 50 kg per mmol of transition metal in a compound (A), before, or before and after, the generation of the olefin (co)polymer (a).

In the above-described catalyst, the olefin (co)polymer (aa) is preferably a propylene homopolymer or a propylene-olefin copolymer comprising at least 50 wt % of propylene polymerization units.

In the above-described catalyst, the olefin (co)polymer (a) is preferably an ethylene homopolymer or an ethylene-olefin copolymer comprising at least 50 wt % of ethylene polymerization units.

In the above-described catalyst, most preferably, the olefin (co)polymer (aa) is a propylene homopolymer or a propylene-olefin copolymer comprising at least 50 wt % of propylene polymerization units, the olefin (co)polymer (a) is an ethylene homopolymer or an ethylene-olefin copolymer comprising at least 60 wt % of ethylene polymerization units, and the catalyst is a catalyst for propylene (co)polymerization.

Next, an olefin (co)polymer composition of the present invention comprises as its main components (a) 0.01 to 5 parts by weight of an olefin (co)polymer having an intrinsic viscosity $[\eta_a]$ measured in tetralin at 135° C. of 15 to 100 dl/g; and (b) 100 parts by weight of an olefin (co)polymer having an intrinsic viscosity $[\eta_b]$ measured in tetralin at 135° C. of 0.2 to 10 dl/g, which is obtained by (co) polymerizing olefins with a polymerization catalyst comprising the following compounds (A) and (B):

compound (A): a transition metal compound having at least one π electron conjugated ligand; and compound (B): at least one compound selected from the group consisting of (B-1) aluminoxane, (B-2) an ionic compound that reacts with the transition metal compound (A) so as to form an ionic complex, and (B-3) a Lewis acid.

In the (co)polymer composition of the present invention, the polymerization catalyst further comprises an organic aluminum compound as a compound (C), in addition to the compounds (A) and (B).

The (co)polymer composition of the present invention preferably has a melt tension (MS) at 230° C. and a melt flow index (MFR) measured under a load of 21.18N at 230° C. that satisfy the following inequality:

log $(MS)$>−1.28×log $(MFR)$+0.44.

In the (co)polymer composition of the present invention, the olefin (co)polymer (a) is preferably an ethylene homopolymer or an ethylene-olefin copolymer comprising at least 50 wt % of ethylene polymerization units.

In the (co)polymer composition of the present invention, the olefin (co)polymer (b) is preferably a propylene homopolymer or a propylene-olefin copolymer comprising at least 50 wt % of propylene polymerization units.

In a first method for producing an olefin (co)polymer composition of the present invention, the main (co)polymerization of olefins is performed with a preactivated catalyst for olefin (co)polymerization obtained by combining the following compounds (A) and (B) or (A), (B) and (C), and (co)polymerizing olefins with this mixture so that an olefin (co)polymer (a) having an intrinsic viscosity [$\eta_a$] measured in tetralin at 135° C. of 15 to 100 dl/g is generated in an amount of 1 g to 500 kg per mmol of transition metal in a compound (A):

compound (A): a transition metal compound having at least one π electron conjugated ligand; and compound (B): at least one compound selected from the group consisting of (B-1) aluminoxane, (B-2) an ionic compound that reacts with the transition metal compound (A) so as to form an ionic complex, and (B-3) a Lewis acid, and compound (C): an organic aluminum compound.

Next, in a second method for producing an olefin (co)polymer composition of the present invention, the main (co)polymerization of olefins is performed with a catalyst for olefin (co)polymerization comprising:

[1] a preactivated catalyst obtained by combining the following compounds (A) and (B) or (A), (B) and (C) and (co)polymerizing olefins with this mixture so that an olefin (co)polymer (a) having an intrinsic viscosity [$\eta_a$] measured in tetralin at 135° C. of 15 to 100 dl/g is generated in an amount of 1 g to 500 kg per mmol of transition metal in a compound (A); and

[2] at least one compound selected from the group consisting of the following compounds (B) and (C):

compound (A): a transition metal compound having at least one π electron conjugated ligand;

compound (B): at least one compound selected from the group consisting of (B-1) aluminoxane, (B-2) an ionic compound that reacts with the transition metal compound (A) so as to form an ionic complex, and (B-3) a Lewis acid; and compound (C): an organic aluminum compound.

Next, a third method for producing an olefin (co)polymer composition of the present invention comprises the steps of preparing a polymerization catalyst comprising the following compounds (A) and (B), (co)polymerizing olefins with the polymerization catalyst so that an olefin (co)polymer (a) having an intrinsic viscosity [$\eta_a$] measured in tetralin at 135° C. of 15 to 100 dl/g is generated in an amount of 1 g to 500 kg per mmol of transition metal in a compound (A), thus preparing a preactivated catalyst, and (co)polymerizing olefins with the preactivated catalyst so that an olefin (co)polymer (b) having an intrinsic viscosity [$\eta_b$] measured in tetralin at 135° C. of 0.2 to 10 dl/g is generated, thereby obtaining a polymer comprising as the main components:

(a) 0.01 to 5 parts by weight of the olefin (co)polymer having an intrinsic viscosity [$\eta_a$] measured in tetralin at 135° C. of 15 to 100 dl/g; and (b) 100 parts by weight of the olefin (co)polymer having an intrinsic viscosity [$\eta_b$] measured in tetralin at 135° C. of 0.2 to 10 dl/g:

compound (A): a transition metal compound having at least one π electron conjugated ligand; and compound (B): at least one compound selected from the group consisting of (B-1) aluminoxane, (B-2) an ionic compound that reacts with the transition metal compound (A) so as to form an ionic complex, and (B-3) a Lewis acid.

In the third method for producing an olefin (co)polymer composition of the present invention, the polymerization catalyst may further comprise an organic aluminum compound as a compound (C), in addition to the compounds (A) and (B).

In the third method for producing an olefin (co)polymer composition of the present invention, olefins may be (co)polymerized with the preactivated catalyst additionally comprising at least one compound selected from the group consisting of the following compounds (B) and (C):

compound (B): at least one compound selected from the group consisting of (B-1) aluminoxane, (B-2) an ionic compound that reacts with the transition metal compound (A) so as to form an ionic complex, and (B-3) a Lewis acid; and compound (C): an organic aluminum compound.

In the first to third methods for producing an olefin (co)polymer composition of the present invention, the obtained olefin (co)polymer composition preferably has a melt tension (MS) at 230° C. and a melt flow index (MFR) measured under a load of 21.18N at 230° C. that satisfy the following inequality:

$$\log (MS) > -1.28 \times \log (MFR) + 0.44.$$

In the first to third methods for producing an olefin (co)polymer composition of the present invention, the olefin (co)polymer (a) is preferably an ethylene homopolymer or an ethylene-olefin copolymer comprising at least 50 wt % of ethylene polymerization units.

In the first to third methods for producing an olefin (co)polymer composition of the present invention, the olefin (co)polymer (b) generated in the main (co)polymerization is preferably a propylene homopolymer or a propylene-olefin copolymer comprising at least 50 wt % of propylene polymerization units.

In the first to third methods for producing an olefin (co)polymer composition of the present invention, an additional preactivation treatment may be performed wherein olefins are (co)polymerized so that an olefin (co)polymer (aa) having an intrinsic viscosity [$\eta_{aa}$] lower than the intrinsic viscosity [$\eta_a$] of the olefin (co)polymer (a) generated in the preactivation treatment is generated in an amount of 1 g to 50 kg per mmol of transition metal in a compound (A), before the preactivation treatment (before the generation of the olefin (co)polymer (a)), or before and after that.

In the first to third methods for producing an olefin (co)polymer composition of the present invention, the olefin (co)polymer (aa) is preferably a propylene homopolymer or a propylene-olefin copolymer comprising at least 50 wt % of propylene polymerization units.

BEST MODE FOR CARRYING OUT THE INVENTION

Figure 1:
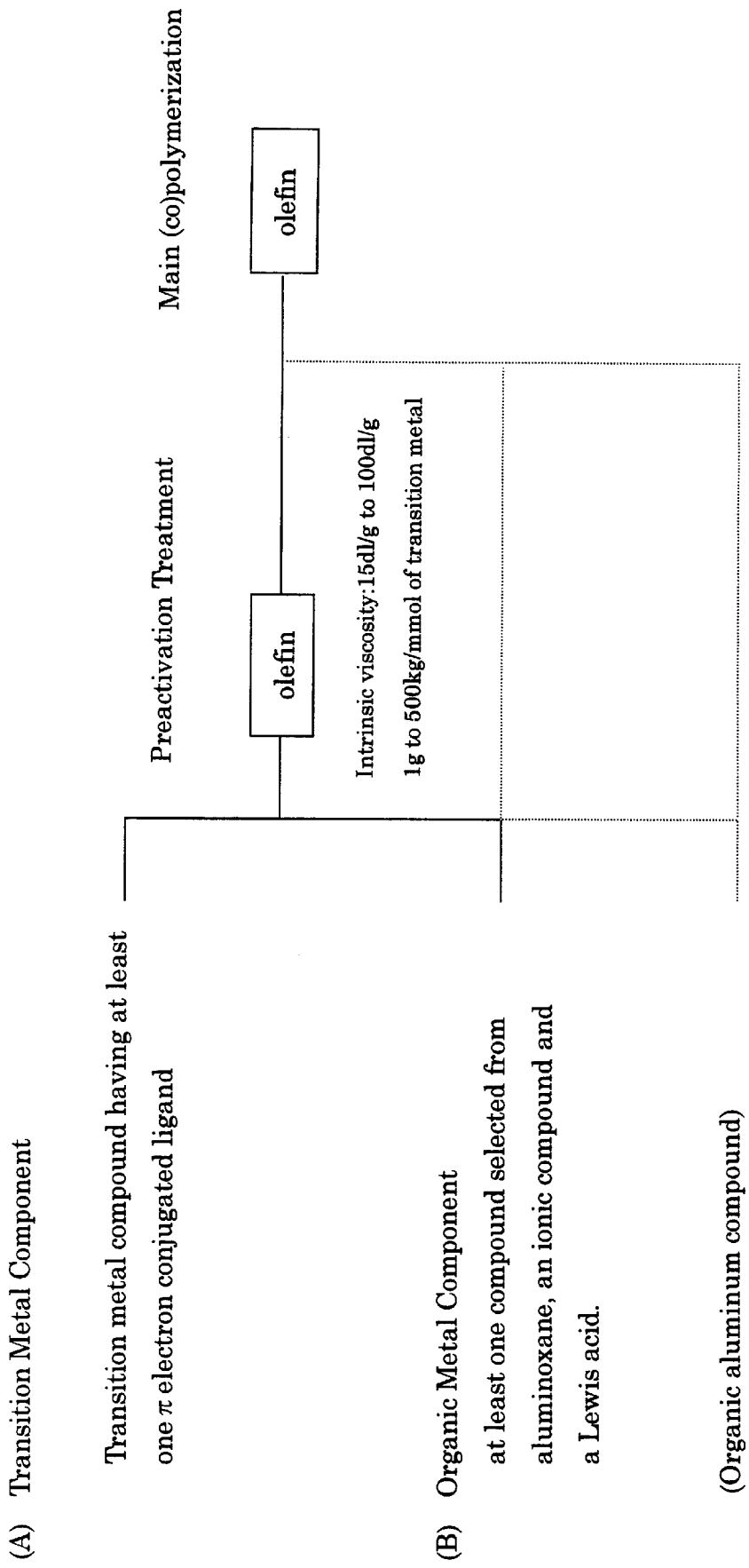
FIG. 1 is a flow sheet showing a method for producing a polypropylene composition of one example of the present invention.

The term "preactivation treatment" in the specification of the present invention refers to a treatment in which a small amount (generally 5 wt % or less, particularly 1 wt % or less of the amount for the main (co)polymerization) of olefins are polymerized with a catalyst for olefin (co)polymerization, prior to the main polymerization of olefins. The catalyst for olefin (co)polymerization is obtained by combining a transition metal compound catalyst component for olefin (co) polymerization and an activator for making the olefin polymerization performance explicit by activating the transition metal compound catalyst. By this treatment, in the case of a homogeneous catalyst, a mixture of a small amount of olefin (co)polymer and the homogeneous catalyst (or a mixed slurry in the case where the treatment is performed in the presence of a solvent) is obtained. In the case where a transition metal compound catalyst component is supported by a carrier, the surface of the supported transition metal compound catalyst component (solid) is coated with olefin (co)polymers. A catalyst that has been subjected to a preactivation treatment is referred to as a "preactivated catalyst".

In the present invention, the following compounds (A) and (B), or (A), (B) and (C) are combined.

Compound (A): a transition metal compound having at least one π electron conjugated ligand;

Compound (B): at least one compound selected from (B-1) aluminoxane, (B-2) an ionic compound that reacts with the transition metal compound (A) so as to form an ionic complex, and (B-3) a Lewis acid; and Compound (C): an organic aluminum compound.

The transition metal compound having at least one π electron conjugated ligand of the compound (A) used in the present invention is generally referred to as a "metallocene", and more specifically, refers to a transition metal compound expressed by the following formula 1:

MLp  (formula 1)

(where M is a transition metal selected from the group consisting of Zr, Ti, Hf, V, Nb, Ta and Cr, p is a valence of the transition metal)

L is a ligand coordinated with the transition metal, and at least one L is a π electron conjugated ligand. Specific examples of the π electron conjugated ligand include a ligand having a 77-cyclopentadienyl structure, a 77-benzene structure, a 77-cycloheptatrienyl structure, or a 77-cyclooctatetraene structure, and a most preferable example is a ligand having a 77-cyclopentadienyl structure.

Examples of the ligand having a 77-cyclopentadienyl structure include a cyclopentadienyl group, an indenyl group, an indenyl hydride group, a fluorenyl group or the like. These groups may be substituted with a hydrocarbon group such as an alkyl group, an aryl group and an aralkyl group, a silicon-substituted hydrocarbon group such as a trialkylsilyl group, a halogen atom, an alkoxy group, an aryloxy group, a chain alkylene group, a cyclic alkylene group or the like.

Furthermore, in the case where the transition metal compound expressed by general formula [1] comprises two or more π electron conjugated ligands, two π electron conjugated ligands can be bridged each other through an alkylene group, a substituted alkylene group, a cycloalkylene group, a substituted cycloalkylene group, a substituted alkylidene group, a phenylene group, a silylene group, a substituted dimethylsilylene group, a germyl group or the like.

Examples of L other than the π electron conjugated ligand include a hydrocarbon group such as an alkyl group, a cycloalkyl group, an aryl group, an aralkyl group, a silicon-substituted hydrocarbon group, an alkoxy group, an aryloxy group, a substituted sulfonato group. Moreover, a bivalent group such as an amidesilylene group and an amidealkylene group may be coupled to a π electron conjugated ligand.

Hereinafter, specific examples of the metallocene compound (A) used in the present invention, will be described, but it is not limited thereto.

Examples of metallocene having one π electron conjugated ligand include (t-butylamide) (tetramethylcyclopentadienyl)-1,2-ethylene zirconium dimethyl, (t-butylamide) (tetramethylcyclopentadienyl)-1,2-ethylene titanium dimethyl, (methylamide) (tetramethylcyclopentadienyl)-1,2-ethylene zirconium dibenzil, (methylamide) (tetramethylcyclopentadienyl)-1,2-ethylene titanium dimethyl, (ethylamide) (tetramethylcyclopentadienyl) methylene titanium dimethyl, (t-butylamide) dibenzil (tetramethylcyclopentadienyl) silylene zirconium dibenzil, (benzilamide) dimethyl (tetramethylcyclopentadienyl) silylene titanium diphenyl, (phenyl phosphido) dimethyl (tetramethylcyclopentadienyl) silylene zirconium dibenzil or the like.

Examples of metallocene having two π electron conjugated ligands are as follows. Examples of metallocene having two π electron conjugated ligands that are not bridged each other, in the case where the transition metal is zirconium, include bis(cyclopentadienyl) zirconium dichloride, bis(cyclopentadienyl) zirconium dimethyl, bis (cyclopentadienyl) zirconium methylchloride, (cyclopentadienyl) (methylcyclopentadienyl) zirconium dichloride, (cyclopentadienyl) (methylcyclopentadienyl) zirconium dimethyl, (cyclopentadienyl) (ethylcyclopentadienyl) zirconium dichloride, (cyclopentadienyl) (ethylcyclopentadienyl) zirconium dimethyl, (cyclopentadienyl) (dimethylcyclopentadienyl) zirconium dichloride, (cyclopentadienyl) (dimethylcyclopentadienyl) zirconium dimethyl, bis (methylcyclopentadienyl) zirconium dichloride, bis (methylcyclopentadienyl) zirconium dimethyl, bis (ethylcyclopentadienyl) zirconium dichloride, bis (ethylcyclopentadienyl) zirconium dimethyl, bis (propylcyclopentadienyl) zirconium dichloride, bis (propylcyclopentadienyl) zirconium dimethyl, bis (butylcyclopentadienyl) zirconium dichloride, bis (butylcyclopentadienyl) zirconium dimethyl, bis (dimethylcyclopentadienyl) zirconium dichloride, bis (dimethylcyclopentadienyl) zirconium dimethyl, bis (diethylcyclopentadienyl) zirconium dichloride, bis (diethylcyclopentadienyl) zirconium dimethyl, bis (methylethylcyclopentadienyl) zirconium dichloride, bis (methylethylcyclopentadienyl) zirconium dimethyl, bis (trimethylcyclopentadienyl) zirconium dichloride, bis (trimethylcyclopentadienyl) zirconium dimethyl, bis (triethylcyclopentadienyl) zirconium dichloride, bis (triethylcyclopentadienyl) zirconium dimethyl or the like. In addition, compounds comprising titanium, hafnium, vanadium, niobium, tantalum or chromium substituted for zirconium in these zirconium compounds can be used.

In the illustrative examples as described above, a compound with a cyclopentadienyl ring substituted at two positions includes 1,2-and 1,3-substituted compounds, and a compound with a cyclopentadienyl ring substituted at three positions includes 1,2,3-and 1,2,4-substituted compounds. Furthermore, an alkyl group such as propyl, butyl or the like includes isomers such as n-(normal-), i-(iso-), sec-(secondary-), tert-(tertiary-), or the like.

Examples of metallocene having two π electron conjugated ligands that are bridged each other include dimethylsilylene (3-t-butylcyclopendadienyl) (fluorenyl) zirconium dichloride, dimethylsilylene (3-t-butylcyclopendadienyl) (fluorenyl) hafnium dichloride, rac-ethylene bis(indenyl) zirconium dimethyl, rac-ethylene bis(indenyl) zirconium dichloride, rac-dimethylsilylene bis(indenyl) zirconium dimethyl, rac-dimethylsilylene bis(indenyl) zirconium dichloride, rac-ethylene bis(tetrahydroindenyl) zirconium dimethyl, rac-ethylene bis(tetrahydroindenyl) zirconium dichloride, rac-dimethylsilylene -bis(tetrahydroindenyl) zirconium dimethyl, rac-dimethylsilylene bis(tetrahydroindenyl) zirconium dichloride, rac-dimethylsilylene bis(2-methyl-4,5,6,7-tetrahydroindenyl) zirconium dichloride, rac-dimethylsilylene bis(2-methyl-4,5,6,7-tetrahydroindenyl) zirconium dimethyl, rac-ethylene bis(2-methyl-4,5,6,7-tetrahydroindenyl) hafnium dichloride, rac-dimethylsilylene bis(2-methyl-4-phenylindenyl) zirconium dichloride, rac-dimethylsilylene bis(2-methyl-4-phenylindenyl) zirconium dimethyl, rac-dimethylsilylene bis(2-methyl-4-phenylindenyl) hafnium dichloride, rac-dimethylsilylene bis(2-methyl-4-naphthylindenyl) zirconium dichloride, rac-dimethylsilylene bis(2-methyl-4-naphthylindenyl) zirconium dimethyl, rac-dimethylsilylene bis(2-methyl-4-naphthylindenyl) hafnium dichloride, rac-dimethylsilylene bis(2-methyl-4,5-benzoindenyl) zirconium dichloride, rac-dimethylsilylene bis(2-methyl-4,5-benzoindenyl) zirconium dimethyl, rac-dimethylsilylene bis(2-methyl-4,5-benzoindenyl) hafnium dichloride, rac-dimethylsilylene bis(2-ethyl-4-phenylindenyl) zirconium dichloride, rac-dimethylsilylene bis(2-ethyl-4-phenylindenyl) zirconium dimethyl, rac-dimethylsilylene bis(2-ethyl-4-phenylindenyl) hafnium dichloride, rac-dimethylsilylene bis(2-methyl-4,6-diisopropylindenyl) zirconium dichloride, rac-dimethylsilylene bis(2-methyl-4,6-diisopropylindenyl) zirconium dimethyl, rac-dimethylsilylene bis(2-methyl-4,6-diisopropylindenyl) hafnium dichloride, dimethylsilylene (2,4-dimethylcyclopentadienyl) (3',5'-dimethylcyclopentadienyl) titanium dichloride, dimethylsilylene (2,4-dimethylcyclopentadienyl) (3',5'-dimethylcyclopentadienyl) zirconium dichloride, dimethylsilylene (2,4-dimethylcyclopentadienyl) (3',5'-dimethylcyclopentadienyl) zirconium dimethyl, dimethylsilylene (2,4-dimethylcyclopentadienyl) (3',5'-dimethylcyclopentadienyl) hafnium dichloride, dimethylsilylene (2,4-dimethylcyclopentadienyl) (3',5'-dimethylcyclopentadienyl) hafnium dimethyl, dimethylsilylene (2,3,5-trimethylcyclopentadienyl) (2',4',5'-trimethylcyclopentadienyl) titanium dichloride, dimethylsilylene (2,3,5-trimethylcyclopentadienyl) (2',4',5'-trimethylcyclopentadienyl) zirconium dichloride, dimethylsilylene (2,3,5-trimethylcyclopentadienyl) (2',4',5'-trimethylcyclopentadienyl) zirconium dimethyl, dimethylsilylene (2,3,5-trimethylcyclopentadienyl) (2',4',5'-trimethylcyclopentadienyl) hafnium dichloride, dimethylsilylene (2,3,5-trimethylcyclopentadienyl) (2',4',5'-trimethylcyclopentadienyl) hafnium dimethyl, or the like.

The compound (A) can be combined with the compound (B) or the compounds (B) and (C) as it is so as to prepare a catalyst. Alternatively, the compound (A) supported by a fine particle carrier can be used. As the fine particle carrier, an inorganic or organic compound in the form of a granular or spherical fine particle solid having a particle diameter of 5 to 300 μm, preferably 10 to 200 μm can be used.

Examples of the inorganic compound used as the carrier include $SiO_2$, $Al_2O_3$, MgO, $TiO_2$, ZnO or the like, or the mixture thereof such as $SiO_2$—$Al_2O_3$, $SiO_2$—MgO, $SiO_2TiO_2$, $SiO_2$—$Al_2O_3$—MgO or the like. Among these, a compound that comprises $SiO_2$, or $Al_2O_3$ as the main component is used preferably.

Furthermore, examples of the organic compound used as the carrier include an α-olefin polymer or copolymer having 2 to 12 carbons such as ethylene, propylene, 1-butene, 4-methyl-1-pentene or the like, or a polymer or a copolymer of styrene or styrene derivatives.

The compound (B) used in the present invention is at least one compound selected from aluminoxane (B-1), an ionic compound that reacts with the transition metal compound (A) so as to form an ionic complex (B-2) and Lewis acids (B-3).

Aluminoxane (B-1) refers to an organic aluminum compound expressed by general formula 2 or 3.

(formula 2)

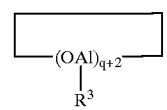

(formula 3)

where $R^3$ is a hydrocarbon group having 1 to 6 carbons, preferably 1 to 4 carbons, more specifically, an alkyl group such as a methyl group, an ethyl group, a propyl group, a butyl group, an isobutyl group, a pentyl group, a hexyl group or the like, an alkenyl group such as an allyl group, a 2-methylallyl group, a propenyl group, an isopropenyl group, a 2-methyl-1-propenyl group, a butenyl group or the like, a cycloalkyl group such as a cyclopropyl group, a cyclobutyl group, a cyclopentyl group, a cyclohexyl group or the like, and an aryl group or the like. Among these, an alkyl group is most preferable, and $R^3$ may be either the same or different.

Furthermore, q is an integer of 4 to 30, preferably 6 to 30, and most preferably 8 to 30.

The aluminoxane can be prepared under a variety of known conditions. Specific examples thereof are as follows:
(1) By reacting trialkyl aluminum directly with water by using an organic solvent such as toluene, ether or the like;
(2) By reacting trialkyl aluminum with salts having crystal water, e.g., a copper sulfate hydrate, an aluminum sulfate hydrate;
(3) By reacting trialkyl aluminum with water impregnated in silica gel or the like;
(4) By mixing trimethyl aluminum and triisobutyl aluminum and reacting the mixture directly with water by using an organic solvent such as toluene, ether or the like;
(5) By mixing trimethyl aluminum and triisobutyl aluminum and reacting the mixture with salts having crystal water, e.g., a copper sulfate hydrate, and an aluminum sulfate hydrate; and
(6) By impregnating silica gel or the like with water and reacting it with triisobutyl aluminum and then trimethyl aluminum.

Furthermore, as for the ionic compound (B-2) that reacts with the transition metal compound (A) so as to form an ionic complex (hereinafter also referred to as "compound (B-2)") and the Lewis acid (B-3), the ionic compounds and the Lewis acids that are described in Japanese Laid-Open Patent Publication (Tokuhyo-Hei (Published Japanese translation of PCT international publication for patent application)) Nos. 1-501950 and 1-502036, (Tokkai-Hei) Nos. 3-179005, 3-179006, 3-207703, 3-207704 or the like can be used.

The ionic compound (B-2) that is usable in the present invention is a salt of a cationic compound and an anionic compound. The anion has a function of cationizing the transition metal compound (A) by reacting with the transition metal compound (A), so as to form an ion pair, so that transition metal cation species can be stabilized. Examples of such anions include organic boron compound anion, organic aluminum compound anion, or the like. Furthermore, examples of the cation include metal cation, organic metal cation, carbonium cation, tropylium cation, oxonium cation, sulfonium cation, phosphonium cation, ammonium cation or the like.

Among these, an ionic compound comprising a boron atom as the anion is preferable, and specific examples thereof include tetrakis (pentafluorophenyl) triethylammonium borate, tetrakis (pentafluorophenyl) tri-n-butylammonium borate, tetrakis (pentafluorophenyl) triphenylammonium borate, tetrakis (pentafluorophenyl) methylanilinium borate, tetrakis (pentafluorophenyl) dimethylanilinium borate, tetrakis (pentafluorophenyl) trimethylanilinium borate, or the like.

Furthermore, as the Lewis acid (B-3), a Lewis acid containing a boron atom is preferable, and the compounds expressed by the following formula can be used.

$$BR^4R^5R^6$$

(where $R^4$, $R^5$, and $R^6$ represent a phenyl group which may have a substituent such as a fluorine atom, a methyl group, trifluorophenyl group or the like, or a fluorine atom, independently.)

Specific examples of the compound expressed by the above general formula include tri(n-butyl) boron, triphenyl boron, tris[3,5-bis(trifluoromethyl)phenyl]boron, tris[(4-fluoromethyl) phenyl] boron, tris(3,5-difluorophenyl) boron, tris(2,4,6-trifluorophenyl) boron, tris(pentafluorophenyl) boron or the like. Among these, tris(pentafluorophenyl) boron is most preferable.

The transition metal compound (A) and the compound (B) are preferably used in the following ratio. In the case where aluminoxane (B-1) is used as the compound (B), the aluminum atom in the aluminoxane (B-1) is preferably in the range from 1 to 50,000 mols, preferably 10 to 30,000 mols, and most preferably 50 to 20,000 mols, per mol of the transition metal atom in the transition metal compound (A).

In the case where the compound (B-2) or Lewis acid (B-3) is used as the compound (B), the compound (B-2) or the Lewis acid (B-3) is preferably used in the range from 0.01 to 2,000 mols, preferably 0.1 to 500 mols, per mol of the transition metal atom in the transition metal compound (A).

The compounds (B) as described above can be used singly or in combinations of two or more.

Furthermore, as for the organic aluminum compound, which is the compound (C) used in the present invention, a compound expressed by the following formula can be used.

$$AlR^7{}_tR^8{}_{t'}X_{3-(t+t')}$$

(where $R^7$ and $R^8$ represent a hydrocarbon group such as an alkyl group, a cycloalkyl group and an aryl group, or an alkoxyl group having 1 to 10 carbons; X represents a halogen atom; and t and t' represent arbitrary numbers satisfying the inequality $0<t+t'\leq 3$.)

Specific examples of the compound expressed by the above formula include trialkyl aluminum such as trimethyl aluminum, triethyl aluminum, triisopropyl aluminum, tri-isobutyl aluminum, tri-n-butyl aluminum or the like, dialkyl aluminum halide such as dimethyl aluminum chloride, dimethyl aluminum bromide, diethyl aluminum chloride, diisopropyl aluminum chloride or the like, and alkyl aluminum sesquihalide such as methyl aluminum sesquichloride, ethyl aluminum sesquichloride, ethyl aluminum sesquibromide, isopropyl aluminum sesquichloride or the like. It is possible to use one or more compounds.

The organic aluminum compound, the compound (C), is preferably used in such a ratio that the aluminum atom in the organic aluminum compound (C) is preferably in the range from 0 to 10,000 mols, preferably 0 to 5,000 mols, and most preferably 0 to 3,000 mols, per mol of the transition metal atom in the transition metal compound (A).

The preactivation treatment is performed in the following manner: 0.0001 to 5,000 mmols, preferably 0.001 to 1,000 mmols of the thus combined compounds are present, on the basis of the transition metal atom in the catalyst component, the compound (A), per liter of olefin (co)polymerization volume. Then, 1 g to 1,000 kg of olefin is supplied thereto and (co)polymerized in the absence of a solvent, or in the presence of a solvent in an amount less than 1000 liters per mmol of the transition metal atoms, so as to generate 1 g to 500 kg of olefin (co)polymer (a) per mmol of the transition metal atoms in the compound (A).

In the specification of the present application, the term "polymerization volume" refers to a volume of the liquid phase portion in a polymerization reactor in the case of liquid phase polymerization, and a volume of the gas phase portion in a polymerization reactor in the case of gas phase polymerization.

The amount of the compound (A) used is preferably within the above-mentioned range so as to maintain an efficient and controlled reaction rate of the olefin (co) polymerization. Furthermore, an excessively small amount of the compound (B) reduces the (co)polymerization reaction rate, and a large amount is also not preferable because the (co)polymerization reaction rate is not correspondingly raised. Furthermore, when the solvent is used in a large amount, not only is a large reactor required, but also it is difficult to control and maintain an efficient (co) polymerization reaction rate.

The olefin (co)polymer (a) that is generated by the preactivation treatment has an intrinsic viscosity $[\eta_a]$ measured in tetralin at 135° C. of 15 to 100 dl/g as described above, and can be either an olefin homopolymer having 2 to 12 carbons or an olefin copolymer having 2 to 12 carbons, preferably an ethylene homopolymer or an ethylene-olefin copolymer containing at least 50 wt % ethylene polymerization units, more preferably an ethylene homopolymer or an ethylene-olefin copolymer containing at least 70 wt % ethylene polymerization units, and most preferably an ethylene homopolymer or an ethylene-olefin copolymer containing at least 90 wt % ethylene polymerization units.

The olefin used in the preactivation treatment is not particularly limited, but olefin having 2 to 12 carbons is used preferably, as described above. Specific examples thereof include ethylene, propylene, 1-butene, 1-pentene, 1-hexene, 1-octene, 1-decene, 4-methyl-1-pentene and 3-methyl-1-pentene. Most preferably, ethylene is used as the main monomer. These olefins can be used in combinations of two or more.

The preactivation treatment can be performed in a liquid phase using an aliphatic hydrocarbon such as butane, pentane, hexane, heptane, octane, isooctane, decane, and dodecane, an alicyclic hydrocarbon such as cyclopentane, cyclohexane, and methylcyclohexane, an aromatic hydrocarbon such as toluene, xylene, and ethylbenzene, or an inactive solvent such as gasoline fraction and hydrogenated diesel oil fraction, or in a liquid phase in which the olefin itself is used as a solvent; or in a gas phase without a solvent.

The preactivation treatment can be performed in the presence of hydrogen, but it is preferable not to use hydrogen in order to generate high molecular weight olefin (co)polymer (a) having an intrinsic viscosity $[\eta_a]$ of 15 to 100 dl/g.

The preactivation treatment can be performed under any conditions, as long as a predetermined amount of the high molecular weight olefin (co)polymer (a) having an intrinsic viscosity $[\eta_a]$ of 15 to 100 dl/g, preferably 17 to 50 dl/g, is generated. Generally, the preactivation treatment is performed at a relatively low temperature of the order of −40° C. to 40° C., preferably −40° C. to 30° C., and more preferably −40° C. to 20° C.; at a pressure of 0.1 MPa to 5 MPa, preferably 0.2 MPa to 5 MPa, most preferably 0.3 MPa to 5 MPa; for 1 min to 24 hours, preferably 5 min to 18 hours, and most preferably 10 min to 12 hours.

Furthermore, in a more preferred embodiment of the present invention, before the preactivation treatment or before and after the preactivation treatment, the additional preactivation treatment can be performed so that an olefin (co)polymer (aa) having an intrinsic viscosity $[\eta_{aa}]$ lower than the intrinsic viscosity $[\eta_a]$ of the olefin (co)polymer (a) is formed in an amount of 1 g to 50 kg per mmol of the transition metal atoms in the compound (A).

The additional preactivation treatment is generally at a temperature of −40 to 100° C. at a pressure of 0.1 to 5 MPa for 1 minute to 24 hours.

The same kinds of catalyst component, solvent, olefin as those used in the preactivation treatment can be used for the additional preactivation treatment.

The intrinsic viscosity $[\eta_{aa}]$ of the olefin (co)polymer (aa) generated in the additional preactivation treatment is smaller than the intrinsic viscosity $[\eta_a]$ of the olefin (co)polymer (a), and the olefin (co)polymer (aa) eventually forms a part of the olefin (co)polymer (b) of component (b) obtained after the main (co)polymerization.

When the preactivation treatment alone is performed, whisker-like or massive olefin (co)polymers (a) may be generated under some conditions. Such olefin (co)polymers (a) may cause production problems such as the adhesion of the olefin (co)polymer to the walls of the preactivation reactor, the difficulty of taking the olefin (co)polymer out from the preactivation reactor, and the generation of massive (co)polymers in the main (co)polymerization. Furthermore, the olefin (co)polymers (a) may not be dispersed in the olefin (co)polymer (b) generated in the main (co)polymerization sufficiently, and the melt tension of the finally-obtained olefin (co)polymer composition is not improved sufficiently. On the other hand, when the additional preactivation treatment is performed, the obtained catalyst slurry has a better shape and not only are the problems in the production solved, but also the olefin (co)polymer (aa) generated in the additional preactivation treatment is dispersed in the olefin (co)polymer (b) sufficiently, because the intrinsic viscosity $[\eta_{aa}]$ of the olefin (co)polymer (aa) is smaller than the intrinsic viscosity $[\eta_a]$ of the olefin (co)polymer (a) generated in the preactivation treatment. As a result, the melt tension of the finally-obtained olefin (co)polymer composition is improved sufficiently.

Therefore, it is a more preferable embodiment that the intrinsic viscosity $[\eta_{aa}]$ of the olefin (co)polymer (aa) is larger than the intrinsic viscosity $[\eta_b]$ of the olefin (co)polymer (b) generated in the main (co)polymerization.

The thus obtained preactivated catalyst or additionally preactivated catalyst is used to (co)polymerize olefin having 2 to 12 carbons so as to produce an olefin (co)polymer (b) as an olefin main (co)polymerization catalyst without further components or with additional component (B) and/or component (C).

Furthermore, in the present invention, other than the preactivated catalyst or the additionally preactivated catalyst as described above, it is possible to use the catalyst added with a known transition metal catalyst component of a so-called Ziegler-Natta catalyst comprising titanium trichloride or titanium tetrachloride or titanium trichloride or titanium tetrachloride supported by magnesium chloride or the like. Hereinafter, in the case where a transition metal catalyst component of a known Ziegler-Natta catalyst is added, the expression "preactivated catalyst" also means a preactivated catalyst comprising the additional transition metal catalyst component.

The catalyst for olefin main (co)polymerization can be used in the same amount range of that at the time of the preactivation treatment of the present invention as described above, including the additional components (B) and (C) that are added, if necessary, at the time of the main (co) polymerization.

The compounds (B) and (C) that are added, if necessary, to the catalyst for olefin main (co)polymerization may be the same as those used in the preactivation treatment or different therefrom.

As the catalyst for olefin main (co)polymerization, powder particles obtained by filtration or decantation for removing the solvent, unreacted olefin, the compounds (B) and (C) present in the preactivated catalyst, or a suspension of the powder particles added with a solvent may be combined with the compounds (B) and/or (C). Alternatively, powder particles obtained by evaporating the solvent and unreacted olefin present in the preactivated catalyst by vacuum distillation, inert gas stream or the like, or a suspension of the powder particles added with a solvent may be combined with the compounds (B) and/or (C), if desired.

The olefin (co)polymer (a) constituting the component (a) of the olefin (co)polymer composition of the present invention has an intrinsic viscosity $[\eta_a]$ measured in tetralin at 135° C. of 15 to 100 dl/g, and can be either a homopolymer or a copolymer of olefin having 2 to 12 carbons, preferably an ethylene homopolymer or an ethylene-olefin copolymer containing at least 50 wt % ethylene polymerization units, more preferably an ethylene homopolymer or an ethylene-olefin copolymer containing at least 70 wt % ethylene polymerization units, and most preferably an ethylene homopolymer or an ethylene-olefin copolymer containing at least 90 wt % ethylene polymerization units. These (co)polymers can be used alone, or in combinations of two or more.

The intrinsic viscosity $[\eta_a]$ of the olefin (co)polymer (a) is suitably in the range from 15 to 100 dl/g, preferably 17 to 50 dl/g, so that the melt tension and the crystallization temperature of the finally-obtained olefin (co)polymer composition can be improved, the olefin (co)polymer (a) can be dispersed in the olefin (co)polymer (b) generated in the main (co)polymerization sufficiently, and the production efficiency can be raised.

The olefin constituting the component of the olefin (co)polymer (a) is not particularly limited, but an olefin having 2 to 12 carbons is preferably used, as described above. Specific examples thereof include ethylene, propylene, 1-butene, 1-pentene, 1-hexene, 1-octene, 1-decene, 4-methyl-1-pentene, and 3-methyl-1-pentene. Most preferably, ethylene is used as the main monomer. These olefins can be used alone or in combinations of two or more.

The density of the olefin (co)polymer (a) is not particularly limited, but specifically, about 880 to 980 g/l is preferable.

The olefin (co)polymer (b) of the component (b) constituting the olefin (co)polymer composition of the present invention is an olefin (co)polymer having an intrinsic viscosity $[\eta_b]$ measured in tetralin at 135° C. of 0.2 to 10 dl/g, and can be either a homopolymer or a copolymer of an olefin having 2 to 12 carbons, but preferably a propylene homopolymer, or a propylene-olefin random copolymer or a propylene-olefin block copolymer containing at least 50 wt % propylene polymerization units, more preferably a propylene homopolymer, or a propylene-olefin random copolymer containing at least 90 wt % propylene polymerization units, or an propylene-olefin block copolymer containing at least 70 wt % propylene polymerization units. These (co) polymers can be used alone, or in combinations of two or more.

The intrinsic viscosity [$\eta_b$] of the olefin (co)polymer (b) is in the range from 0.2 to 10 dl/g, preferably 0.5 to 8 dl/g, in terms of the mechanical characteristics and formability of the finally-obtained olefin (co)polymer composition. The olefins constituting the olefin (co)polymer (b) are not particularly limited, but an olefin having 2 to 12 carbons is used preferably, as described above. Specific examples thereof include ethylene, propylene, 1-butene, 1-pentene, 1-hexene, 1-octene, 1-decene, 4-methyl-1-pentene, and 3-methyl-1-pentene. Most preferably, propylene is used as the main monomer. These olefins can be used alone or in combinations of two or more.

Furthermore, the olefin (co)polymer (b) of the component (b) of the present invention is obtained by (co)polymerizing olefins with a catalyst comprising the components (A) and (B) or the components (A), (B) and (C), as described above.

A specific catalyst comprising the thus combined components (A) and (B) or components (A), (B) and (C) is used to (co)polymerize olefins so as to obtain the olefin (co) polymer (b) used in the composition of the present invention. The olefin (co)polymerization can be effected in a known olefin (co)polymerization process, for example, a slurry polymerization method in which olefin is (co) polymerized in an aliphatic hydrocarbon such as butane, pentane, hexane, heptane, and isooctane, an alicyclic hydrocarbon such as cyclopentane, cyclohexane and methylcyclohexane, an aromatic hydrocarbon such as toluene, xylene and ethylbenzene, or an inactive solvent such as gasoline fraction and hydrogenated diesel oil fraction; bulk polymerization in which the olefin itself is used as a solvent; and a gas phase polymerization method in which olefin (co)polymerization is effected in the gas phase; and solution polymerization in which polyolefin generated in the (co)polymerization is in the form of liquid. Two or more of the above-mentioned polymerization processes can be combined.

In polymerizing olefin, for the specific catalyst, the compounds (A) and (B), or (A), (B) and (C) may be previously mixed in an inactive solvent, and then the mixture may be supplied to a polymerization reaction system. Alternatively, the compounds (A) and (B), or (A), (B) and (C) may be supplied to a polymerization reaction system separately. Furthermore, the following process is effective to obtain an olefin (co)polymer (b) having satisfactorily shaped particles: Prior to the main polymerization of olefin, a preactivation treatment is performed in which a small amount of olefin, more specifically, about 1 g to 500 kg of olefin per mmol of the transition metal in the compound (A), is reacted for polymerization with a catalyst comprising the compounds (A) and (B) or (A), (B) and (C) in an inactive solvent, so as to prepare a preactivated catalyst. Then, the main polymerization of olefin is performed. This is also in the scope of the present invention.

A preferable olefin that can be used in the preactivation treatment is α-olefin having 2 to 12 carbons. Specific examples thereof include ethylene, propylene, butene, pentene, hexene, octene and 4-methyl-1-pentene. Among these, ethylene, propylene and 4-methyl-1-pentene can be used preferably.

The thus prepared specific catalyst or the preactivated specific catalyst used in the present invention is used for the polymerization of olefin by the above-mentioned polymerization methods. As for the polymerization conditions in the propylene polymerization, the same polymerization conditions as in the olefin (co)polymerization with a known Ziegler-Natta catalyst are adopted. More specifically, the polymerization is performed at a temperature of −50 to 150° C., preferably −10 to 100° C.; at a pressure from the atmospheric pressure to 7 MPa, preferably 0.2 MPa to 5 MPa; generally for 1 min to 20 hours in the presence of hydrogen acting as a molecular weight modifier so that the intrinsic viscosity [$\eta_b$] measured in tetralin at 135° C. of the obtained olefin (co)polymer (b) is 0.2 to 10 dl/g.

After the (co)polymerization of olefin is complete, known post-treatment processes such as a catalyst deactivating treatment process, a catalyst residue removing process and a drying process are performed, if necessary. Therefore, an olefin (co)polymer (b) having an intrinsic viscosity [$\eta_b$] measured in tetralin at 135° C. of 0.2 to 10 dl/g can be obtained for use in the present invention.

The olefin (co)polymer composition of the present invention comprises 0.01 to 5 parts by weight, preferably 0.02 to 2 parts by weight, and most preferably 0.05 to 1 part by weight, of the olefin (co)polymer (a) of the component (a) and 100 parts by weight of the olefin (co)polymer (b) of the component (b).

The amount of the olefin (co)polymer (a) of the component (a) is preferably in the above-mentioned range in view of the improvement of the melt tension and the crystallization temperature of the obtained olefin (co)polymer composition and the homogeneity of the composition.

The olefin (co)polymer composition of the present invention preferably has a melt tension (MS) at 230° C. and a melt flow index (MFR) measured under a load of 21.18N at 230° C. that satisfy the following inequality:

$$\log\ (MS) > -1.28 \times \log\ (MFR) + 0.44.$$

Although the upper limit is not particularly limited, it is preferably such that the following inequality is satisfied:

- −1.28×log (MFR)+2.06>log (MS)>−1.28×log (MFR)+ 0.44, more preferably,
- −1.28×log (MFR)+2.06>log (MS)>−1.28×log (MFR)+ 0.54, most preferably,
- −1.28×log (MFR)+1.76>log (MS)>−1.28×log (MFR)+ 0.66, because an excessively high melt tension deteriorates the formability of the composition.

The melt tension at 230° C. is a value (unit: cN) obtained by using the MELT TENSION II (manufactured by TOYO SEIKI SEISAKU-SHO, Ltd), heating the polypropylene composition to 230° C. in the equipment, extruding the molten polypropylene composition through a nozzle of a diameter of 2.095 mm at a rate of 20 mm/min to the air of 23° C. so as to make a strand, and measuring the tension of a thread like polypropylene composition when taking up the strand at a rate of 3.14 m/min.

Any methods can be used for producing the polypropylene composition of the present invention, even if the melt tension of the composition is a high value as shown in the above-mentioned range. However, the composition is more easily produced by the following method: A preactivation treatment is performed to (co)polymerize olefins with a metallocene based-catalyst for olefin (co)polymerization so as that a small amount of olefin (co)polymer (a) having a specific intrinsic viscosity is generated, prior to the main (co)polymerization. Thus, a preactivated catalyst is prepared. The main (co)polymerization of olefins is performed with the preactivated catalyst so as to produce the olefin (co)polymer (b), and thus a final olefin (co)polymer is obtained.

In a method for producing the olefin (co)polymer composition of the present invention, the preactivated catalyst is used in an amount of 0.0001 to 5,000 mmols, preferably 0.001 to 1000 mmols per liter of the polymerization volume, on the basis of the transition metal atom in the preactivated catalyst. The transition metal compound catalyst component is used in the above-mentioned amount, so that an efficient and controlled reaction rate of the olefin (co)polymerization can be maintained.

The main (co)polymerization of olefins with the preactivated catalyst in the present invention can be effected in the known olefin (co)polymerization processes and the polymerization conditions described when producing the olefin (co)polymer (b).

In the method for producing the olefin (co)polymer composition of the present invention, the polymerization conditions are selected so that the olefin (co)polymer (a) derived from the preactivated catalyst used is produced in an amount of 0.01 to 5 parts by weight on the basis of 100 parts by weight of the olefin (co)polymer (b) generated in the main (co)polymerization.

After the main (co)polymerization is complete, known post-treatment processes such as a catalyst deactivating treatment process, a catalyst residue removing process, a drying process or the like are performed, if necessary. Thus, a targeted olefin (co)polymer composition having a high melt tension and a high crystallization temperature can be obtained as a final product.

In the method for producing the olefin (co)polymer composition of the present invention, the olefin (co)polymer (a) having a high intrinsic viscosity is generated by the preactivation treatment process, and is dispersed in the finally-obtained olefin (co)polymer composition uniformly. Therefore, it is possible to prepare a necessary amount of the preactivated catalyst in a large amount. Moreover, since regular olefin (co)polymerization by using a known process can be used for the main (co)polymerization of olefin, the production amount is equivalent to that in regular olefin (co)polymer production using a metallocene catalyst.

By using the method for producing the olefin (co)polymer composition employing the preactivated catalyst of the present invention, it is possible to obtain easily an olefin (co)polymer composition that satisfies the above-mentioned relationship between the melt tension (MS) at 230° C. and the melt low index (MFR) at 230° C. under a load of 21.18N.

The obtained olefin (co)polymer composition can be mixed with a variety of additives such as an antioxidant, an ultraviolet absorber, an antistatic agent, a nucleating agent, a lubricant, a flame retardant, an anti-blocking agent, a coloring agent, an inorganic or organic filler, or a variety of synthetic resins, if necessary. Then, the composition is generally heated, melted and kneaded, and then cut into granular pellets for formation in a variety of molds.

Hereinafter, the present invention will be more specifically described by way of examples and comparative examples.

The definition of terms and measurement methods used in the Examples and Comparative Examples are as follows.
(1) Intrinsic viscosity [η] a value (unit: dl/g) as a result of measurement by an Ostwald's viscometer (manufactured by Mitsui Toatsu Chemicals, Inc.) of an intrinsic viscosity measured in tetralin at 135° C.
(2) Melt flow rate (MFR): a value (unit: g/10 min.) as a result of measurement under the condition 14 (under a load of 21.18 N at 230° C.) of Table 1 according to JIS K7210.
(3) Melt tension (MS): a value (unit: cN) as a result of measurement by using MELT TENSION II (manufactured by TOYO SEIKI SEISAKU-SHO, Ltd).
(4) Crystallization temperature (Tc): a temperature (unit:° C.) at a peak of crystallization obtained by using a differential scanning calorimeter VII (manufactured by PERKIN-ELMER Ltd.), warming the olefin (co)polymer composition from room temperature to 230° C. at 30° C/min, allowing it to stand at 230° C. for 10 min., cooling it to −20° C. at −20° C/min., allowing it to stand at −20° C. for 10 min., warming it to 230° C. at 20° C/min, allowing it to stand at 230° C. for 10 min., cooling it to 150° C. at −80° C/min, and further cooling it from 150° C. at −5° C/min to reach the maximum peak of crystallization.
(5) Heat stability: 0.1 parts by weight of 2,6-di-t-butyl-p-cresol and 0.1 parts by weight of calcium stearate are mixed with 100 parts by weight of the olefin (co)polymer composition. The mixture is melted, kneaded and pelletized by an extruder with a screw having a diameter of 40 mm at 230° C., and thus pellets of the olefin (co)polymer composition are prepared.

Heat stability is calculated as follows: The obtained pellets and the pellets finally obtained as a result of further repeating melting and kneading, and pelletizing the obtained pellets by the extruder twice are measured according to the condition 14 of Table 1 of JIS K7210, so that a difference between the MFR of the finally-obtained pellets and MFR of the firstly-obtained pellets (the finally-obtained pellet MFR—the firstly-obtained pellet MFR=ΔMFR) was calculated.

A smaller difference (ΔMFR) indicates better heat stability.

EXAMPLE 1
(1) Production of Preactivated Catalyst

The air in a stainless steel reactor provided with an inclined turbine agitator having an inner volume of 20 dm$^3$ was replaced with a nitrogen gas. Then, 10 dm$^3$ of toluene, 12.0 mol (on the basis of Al atom) of a toluene solution of methylaluminoxane (product name: MMAO manufactured by TOSOH AKZO CORPORATION, a concentration of 2 mol/dm$^3$) and a mixture as metallocene of 5.92 mmol of chiral dimethylsilylene (2,3,5-trimethylcyclopentadienyl) (2',4',5'-trimethylcyclopentadienyl) hafnium dichloride and 0.20 mmol of dimethylsilylene (2,3,5-trimethylcyclopentadienyl) (2',3',5'-trimethylcyclopentadienyl) hafium dichloride of a meso compound together with 1 dm$^3$ of toluene were introduced into the reactor at 20° C. Then, after the temperature in the reactor is lowered to 0° C., 14 g of propylene was supplied to the reactor so as to perform an additional preactivation treatment at 0° C. for 20 minutes.

When polymers generated by an additional preactivation treatment under the same conditions separately were analyzed, it was found that polypropylene (aa) having an intrinsic viscosity [η$_{aa}$] of 4.7 dl/g measured in tetralin at 135° C. was generated in an amount of 8 g.

After the reaction time passed, unreacted propylene was discharged from the reactor, and the gas phase in the reactor was replaced with nitrogen once. Then, ethylene was supplied to the reactor continuously for one hour while maintaining the temperature in the reactor at −20° C. and the pressure n the reactor at 0.59 MPa, so as to perform a preactivation treatment.

Separately, an additional preactivation treatment and a preactivation treatment were performed under the same conditions, and the generated polymers were analyzed. As a result, it was found that polymers having an intrinsic viscosity $[\eta_T]$ of 27.0 dl/g when measured in tetralin at 135° C. were generated in an amount of 80 g.

The amount ($W_a$) of the polyethylene (a) generated by the preactivation treatment with ethylene can be obtained by the following equation as a difference between the amount ($W_T$) of the polymer generated after the treatment comprising the additional preactivation treatment and the preactivation treatment and the amount ($W_{aa}$) of the polypropylene (aa) after the additional preactivation treatment.

$$W_a = W_T - W_{aa}$$

The intrinsic viscosity $[\eta_a]$ of the polyethylene (a) generated by the preactivation treatment with ethylene can be obtained from the intrinsic viscosity $[\eta_{aa}]$ of the polypropylene (aa) generated by the additional preactivation treatment and the intrinsic viscosity $[\eta_T]$ of the polymers generated after the treatment comprising the additional preactivation treatment and the preactivation treatment by the following equation.

$$[\eta_a] = ([\eta_T] \times W_T - [\eta_{aa}] \times W_{aa})/(W_T - W_{aa})$$

According to the above equation, the amount of the polyethylene (a) generated by the preactivation treatment with ethylene was 72 g, and the intrinsic viscosity $[\eta_a]$ thereof was 29.5 dl/g. After the reaction time passed, unreacted ethylene was discharged out of the reactor, and the gas phase in the reactor was replaced with nitrogen once, thus producing a preactivated catalyst slurry for the main (co)polymerization.

(2) Production of Olefin (co)polymer composition (Main (co)polymerization of propylene)

The air in a stainless steel reactor with an agitator having an inner volume of 100 dm³ was replaced with a nitrogen gas. Then, 50 dm³ of toluene, 8.0 mol (on the basis of Al atom) of a toluene solution of methylaluminoxane (product name: MMAO manufactured by TOSOH AKZO CORPORATION, a concentration of 2 mol/dm³) and a fourth of the amount of the preactivated catalyst slurry obtained in the above section (1) were introduced into the polymerization reactor. After the temperature in the polymerization reactor became 30° C., propylene was supplied to the polymerization reactor continuously for four hours at a temperature of 30° C. while maintaining the pressure in the gas phase portion in the polymerization reactor at 0.4 MPa, so as to perform the main polymerization of propylene.

After the polymerization was complete, unreacted propylene was discharged out of the polymerization reactor. Thereafter, 3 dm³ of 2-propanol was introduced to the polymerization reactor, so as to deactivate the catalyst while stirring at 30° C. for 10 min. Then, 0.2 dm³ of an aqueous solution of hydrogen chloride (concentration: 12 mol/dm³) and 8 dm³ of methanol were added, and treated at 60° C. for 30 min. Thereafter, stirring was stopped, and the water phase portion was removed from the lower part of the polymerization reactor, the same amount of aqueous solution of hydrogen chloride and methanol were added and the same operation was repeated. Then, 0.02 dm³ of an aqueous solution of sodium hydroxide (concentration: 5 mol/dm³), 2 dm³ of water and 2 dm³ of methanol were added, and stirred at 30° C. for 10 min. Thereafter, stirring was stopped, and the water phase portion was removed from the lower part of the polymerization reactor, and 8 dm³ of water was further added and stirred at 30° C. for 10 min, and the water phase portion was removed. This operation was repeated twice. Thereafter, a polymerized slurry was extracted from the polymerization reactor, and filtered and dried. Thus, a polypropylene composition of the olefin (co)polymer composition of the present invention having an intrinsic viscosity $[\eta_{TT}]$ of 1.93 dl/g was obtained in an amount of 3.6 kg.

The analysis results of the obtained polypropylene composition and the calculation results of the amount and the intrinsic viscosity $[\eta]$ of the polyethylene (a) generated in the above-described preactivation treatment make it possible to calculate the total amount ($W_b$) of the polypropylene (b) with the following equation, because the polypropylene (aa) generated in the additional preactivation treatment can be regarded as part of the polypropylene (b).

$$W_b = W_{TT} - W_a$$

where $W_a$ represents the total amount (72 g×¼=18 g) of the polyethylene (a) in the final polypropylene composition, and WT represents the whole amount (3600 g) of the polypropylene composition. Therefore, when the amount ($W_b$) of the polypropylene (b) is 100 parts by weight, the parts by weight ($W_{Ra}$) of the polyethylene (a) can be calculated with the following equation:

$$W_{Ra} = W_a \times 100/W_b$$

The intrinsic viscosity $[\eta_b]$ of the polypropylene (b) can be calculated with the following equation.

$$[\eta_b] = ([\eta_{TT}] \times W_{TT} - [\eta_a] \times W_a)/(W_{TT} - W_a)$$

where $[\eta_{TT}]$ represents the intrinsic viscosity $[\eta]$ of the entire polypropylene composition, and $[\eta_a]$ represents the intrinsic viscosity $[\eta]$ of the polyethylene (a) generated in the above-described preactivated treatment. $W_{TT}$ and $W_b$ are the same as above.

According to the above equation, the parts by weight of the polyethylene (a) was 0.50 parts by weight, and the intrinsic viscosity $[\eta]$ of the polypropylene (b) was 1.79 dl/g.

0.1 parts by weight of 2,6-di-t-butyl-p-cresol and 0.1 parts by weight of calcium stearate were mixed with 100 parts by weight of the obtained polypropylene composition, and the mixture was pelletized by an extruder with a screw having a diameter of 40 mm at 230° C. so that pellets were produced. When various properties of the pellets were evaluated, the results were such that the MFR was 2.8 g/10 min, the crystallization temperature was 124.3° C. and the melt tension (MS) was 1.8 cN. Other properties are shown in Table 1.

COMPARATIVE EXAMPLE 1

Polypropylene was produced under the same conditions as in Example 1, except that the preactivation treatment with ethylene was not performed. An evaluation sample for Comparative Example 1 was prepared from the obtained polypropylene. The properties of the obtained polypropylene composition are shown in Table 1.

EXAMPLES 2 AND 3, AND COMPARATIVE EXAMPLE 2

A polypropylene composition was produced under the same conditions as in Example 1, except that the conditions for the preactivation treatment with ethylene were changed to change the intrinsic viscosity [η] of polyethylene (a) and the amount of polyethylene (a) to be generated. Thus, evaluation samples for Examples 2 and 3 and Comparative Example 2 were prepared. The properties of the obtained polypropylene composition are shown in Table 1.

COMPARATIVE EXAMPLE 3

The air in a reactor provided with an inclined turbine agitator was replaced with nitrogen gas. Then, 10 kg of propylene homopolymer powder having an intrinsic viscosity [η] of 1.67 dl/g and an average particle diameter of 150 μm was placed therein. The propylene homopolymer powder was obtained by slurry polymerization of propylene in n-hexane with a catalyst comprising a titanium-containing catalyst component comprising a titanium trichloride composition, diethylaluminum chloride and a third component, diethyleneglycoldimethylether. Then, the reactor was evacuated and the operation of supplying a nitrogen gas until reaching the atmospheric pressure was repeated 10 times. Thereafter, 0.35 mol of 70 wt % di-2-ethylhexyl peroxy dicarbonate (modifier) in a toluene solution was added and mixed therewith at 25° C. Then, the temperature in the reactor was raised to 120° C., and the mixture was reacted at that temperature for 30 minutes. After the reaction time passed, the temperature in the reactor was raised to 135° C., and a post treatment was performed at that temperature for 30 minutes. After the post treatment, the reactor was cooled to room temperature and the reactor was opened so as to obtain polypropylene.

0.1 parts by weight of 2,6-di-t-butyl-p-cresol and 0.1 parts by weight of calcium stearate were mixed with 100 parts by weight of the obtained polypropylene, and the mixture was pelletized by an extruder with a screw having a diameter of 40 mm at 230° C. so that pellets were produced. Thus, an evaluation sample for Comparative Example 3 was prepared. Then, various properties of the obtained pellets were evaluated. The results are shown in Table 1.

EXAMPLE 4

A polypropylene composition was produced under the same conditions as in Example 1, except that in place of propylene, a mixed gas of 1 mol % of ethylene and 99 mol % of propylene was supplied to the polymerization reactor in the main polymerization of propylene, so that ethylene-propylene copolymerization was effected. Thus, an evaluation sample for Example 4 was prepared. The properties of the obtained polypropylene composition are shown in Table 2.

EXAMPLE 5

A polypropylene composition was produced under the same conditions as in Example 1, except that 0.15 mol of hydrogen also was supplied to the polymerization reactor immediately before the main polymerization of propylene. Thus, an evaluation sample for Example 5 was prepared. The properties of the obtained polypropylene composition are shown in Table 2.

COMPARATIVE EXAMPLE 4

A polypropylene composition was produced under the same conditions as in Comparative Example 1, except that 0.15 mol of hydrogen also was supplied to the polymerization reactor immediately before the main polymerization of propylene. Thus, evaluation samples for Comparative Examples 4 were prepared. The properties of the obtained polypropylene compositions are shown in Table 2.

TABLE 2

| Example and Comparative Example .No. | | Ex. 4 | Ex. 5 | Com. Ex. 4 |
|---|---|---|---|---|
| PO*[1] (a) | Intrinsic viscosity[η] (dl/g) | 29.5 | 29.5 | — |
| | Parts by weight | 0.42 | 0.51 | — |
| PO*[2] (b) | Intrinsic viscosity[η] (dl/g) | 1.81 | 1.51 | 1.51 |
| | Parts by weight | 100 | 100 | 100 |
| Olefin (co)polymer composition | Intrinsic viscosity[η] (dl/g) | 1.93 | 1.65 | 1.51 |
| | Melt tension (MS) (cN) | 1.7 | 1.5 | 0.1 |
| | Crystallization Temperature (Tc) (° C.) | 123.1 | 124.6 | 118.2 |
| | First pellet MFR (g/10 min) | 2.8 | 5.8 | 8.9 |
| | Final pellet MFR (g/10 min) | 3.0 | 6.1 | 9.3 |
| | ΔMFR (g/10 min) | 0.2 | 0.3 | 0.4 |

Note: *[1]represents olefin (co)polymer (a).
*[2]represents olefin (co)polymer (b).

Industrial Applicability

As described above, according to the present invention, an olefin (co)polymer having a high melt tension, a high crystallization temperature and excellent heat stability can

TABLE 1

| Example and Comparative Example .No. | | Ex. 1 | Com. Ex. 1 | Com. Ex. 2 | Ex. 2 | Ex. 3 | Com. Ex. 3 |
|---|---|---|---|---|---|---|---|
| PO*[1] (a) | Intrinsic viscosity[η] (dl/g) | 29.5 | — | 9.2 | 29.5 | 21.2 | — |
| | Parts by weight | 0.50 | — | 0.11 | 0.10 | 0.69 | — |
| PO*[2] (b) | Intrinsic viscosity[η] (dl/g) | 1.79 | 1.79 | 1.79 | 1.79 | 1.79 | — |
| | Parts by weight | 100 | 100 | 100 | 100 | 100 | — |
| Olefin (co)polymer composition | Intrinsic viscosity[η] (dl/g) | 1.93 | 1.79 | 1.80 | 1.82 | 1.93 | 1.68 |
| | Melt tension (MS) (cN) | 1.8 | 0.4 | 0.4 | 1.1 | 1.2 | 7.2 |
| | Crystallization Temperature (Tc) (° C.) | 124.3 | 118.0 | 118.8 | 123.5 | 122.4 | 129.4 |
| | First pellet MFR (g/10 min) | 2.8 | 4.0 | 3.9 | 3.7 | 2.8 | 9.2 |
| | Final pellet MFR (g/10 min) | 3.0 | 4.3 | 4.2 | 3.9 | 3.0 | 17.5 |
| | ΔMFR (g/10 min) | 0.2 | 0.3 | 0.3 | 0.2 | 0.2 | 8.3 |

Note: *[1]represents olefin (co)polymer (a).
*[2]represents olefin (co)polymer (b).

be produced by combining (A) a transition metal compound having at least one π electron conjugated ligand; and (B) at least one compound selected from aluminoxane, an ionic compound that reacts with the transition metal compound (A) so as to form an ionic complex, and a Lewis acid; or by combining the compounds (A) and (B), and (C) an organic aluminum compound, and (co)polymerizing olefin so that an olefin (co)polymer (a) having an intrinsic viscosity [η$_a$] measured in tetralin at 135° C. of 15 to 100 dl/g was produced in an amount of 1 g to 500 kg per mmol of transition metal in the compound (A). This is especially useful for main polymerization of propylene.

Furthermore, the polypropylene composition of the present invention is excellent in formability because the melt tension and the crystallization temperature are high, as shown in the Examples, and is also excellent in heat stability, so that the productivity in the forming process is high. In addition, the composition is formed into a molded product, and after use, the molded product can be melted and reused in a further molding process. Moreover, the composition can be subjected to blow molding, foam molding, extrusion molding, injection molding, T-die molding, thermoforming or the like so as to produce various container such as a hollow container, or various molds such as a film, a sheet, a pipe and a fiber. Thus, the field of utilization for polypropylene can be expanded significantly.

What is claimed is:

1. A preactivated catalyst for olefin (co)polymerization obtained by (co)polymerizing olefins with compounds comprising the following compounds (A) and (B) so that an olefin (co)polymer (a) comprising an ethylene homopolymer or an ethylene-olefin copolymer comprising at least 50 wt % of ethylene polymerization units and having an intrinsic viscosity $\eta_a$ a measured in tetralin at 135° C. of 15 to 100 dl/g is generated in an amount of 1 g to 500 kg per mmol of transition metal in a compound (A):

compound (A): a transition metal compound having at least one $\pi$ electron conjugated ligand; and compound (B): at least one compound selected from the group consisting of (B-1) aluminoxane, (B-2) an ionic compound that reacts with the transition metal compound (A) so as to form an ionic complex, and (B-3) a Lewis acid;

wherein an olefin (co)polymer (aa) comprising a propylene homopolymer or a propylene-olefin copolymer comprising at least 50 wt % of propylene polymerization units and having an intrinsic viscosity ($\eta_{aa}$) lower than the intrinsic viscosity ($\eta_a$) of the olefin (co)polymer (a) is generated in an amount of 1 g to 50 kg per mmol of transition metal in a compound (A), before the (co)polymerization of olefins to form the olefin (co)poymer (a), or before and after, the (co)polymerization of olefins to form the olefin (co)polymer (a).

2. A catalyst for olefin (co)polymerization comprising:

(1) a preactivated catalyst obtained by (co)polymerizing olefins with compounds comprising the following compounds (A) and (B) so that an olefin (co)polymer (a) comprising an ethylene homopolymer or an ethylene-olefin copolymer comprising at least 50 wt % of ethylene polymerization units and having an intrinsic viscosity ($\eta_a$) measured in tetralin at 135° C. of 15 to 100 dl/g is generated in an amount of 1 g to 500 kg per mmol of transition metal in a compound (A); and (2) at least one compound selected from the group consisting of the following compounds (B) and (C):

compound (A): a transition metal compound having at least one $\pi$ electron conjugated ligand;

compound (B): at least one compound selected from the group consisting of (B-1) aluminoxane, (B-2) an ionic compound that reacts with the transition metal compound (A) so as to form an ionic complex, and (B-3) a Lewis acid; and compound (C): an organic aluminum compound, wherein an olefin (co)polymer (aa) comprising a propylene homopolymer or a propylene-olefin copolymer comprising at least 50 wt % of propylene polymerization units and having an intrinsic viscosity ($\eta_{aa}$) lower than the intrinsic viscosity ($\eta_a$) of the olefin (co)polymer (a) is generated in an amount of 1 g to 50 kg per mmol of transition metal in a compound (A), before the (co)polymerization of olefins to form the olefin (co)polymer (a), or before and after, the (co)polymerization of olefins to form the olefin (co)polymer (a).

3. An olefin (co)polymer composition comprising as main components:

0.01 to 5 parts by weight of an olefin (co)polymer (a) comprising an ethylene homopolymer or an ethylene-olefin copolymer comprising at least 50 wt % of ethylene polymerization units and having an intrinsic viscosity ($\eta_a$) measured in tetralin at 135° C. of 15 to 100 dl/g; and 100 parts by weight of an olefin (co)polymer (b) comprising a propylene homopolymer or a propylene-olefin copolymer comprising at least 50 wt % of propylene polymerization units and having an intrinsic viscosity ($\eta_b$) measured in tetralin at 135° C. of 0.2 to 10 dl/g, which is obtained by (co)polymerizing olefins with a polymerization catalyst having compounds comprising the following compounds (A) and (B):

compound (A): a transition metal compound having at least one $\pi$ electron conjugated ligand; and compound (B): at least one compound selected from the group consisting of (B-1) aluminoxane, (B-2) an ionic compound that reacts with the transition metal compound (A) so as to form an ionic complex, and (B-3) a Lewis acid.

4. A method for producing an olefin (co)polymer composition, wherein main (co)polymerization of propylene alone or propylene and other olefin is performed with a preactivated catalyst for olefin (co)polymerization, the preactivated catalyst having been obtained by (co)polymerizing ethylene alone or ethylene and other olefin with compounds comprising the following compounds (A) and (B) so that an ethylene homopolymer or an ethylene-olefin copolymer comprising at least 50 wt % of ethylene polymerization units having an intrinsic viscosity ($\eta_a$) measured in tetralin at 135° C. of 15 to 100 dl/g is generated in an amount of 1 g to 500 kg per mmol of transition metal in a compound (A):

compound (A): a transition metal compound having at least one $\pi$ electron conjugated ligand; and compound (B): at least one compound selected from the group consisting of (B-1) aluminoxane, (B-2) an ionic compound that reacts with the transition metal compound (A) so as to form an ionic complex, and (B-3) a Lewis acid.

5. A method for producing an olefin (co)polymer composition, wherein main (co)polymerization of propylene alone or propylene and other olefin is performed with a catalyst for olefin (co)polymerization comprising:

(1) a preactivated catalyst obtained by (co)polymerizing ethylene alone or ethylene and other olefin with compounds comprising the following compounds (A) and (B) so that an ethylene homopolymer or an ethylene-olefin copolymer comprising at least 50 wt % of ethylene polymerization units having an intrinsic viscosity ($\eta_a$) measured in tetralin at 135° C. of 15 to 100 dl/g is generated in an amount of 1 g to 500 kg per mmol of transition metal in a compound (A); and (2) at least one compound selected from the group consisting of the following compounds (B) and (C):

compound (A): a transition metal compound having at least one $\pi$ electron conjugated ligand;

compound (B): at least one compound selected from the group consisting of (B-1) aluminoxane, (B-2) an ionic compound that reacts with the transition metal compound (A) so as to form an ionic complex, and (B-3) a Lewis acid; and compound (C): an organic aluminum compound.

6. A method for producing an olefin (co)polymer composition comprising the steps of:

preparing a polymerization catalyst having compounds comprising the following compounds (A) and (B);

(co)polymerizing ethylene alone or ethylene and other olefin with the polymerization catalyst so that an olefin (co)polymer (a) comprising ethylene homopolymer or an ethylene-olefin copolymer comprising at least 50 wt % of ethylene polymerization units and having an intrinsic viscosity ($\eta_a$) measured in tetralin at 135° C. of 15 to 100 dl/g is generated in an amount of 1 g to 500 kg per mmol of transition metal in a compound (A), thus preparing a preactivated catalyst; and (co)polymerizing propylene alone or propylene and other olefin with the preactivated catalyst so that an olefin (co)polymer (b) comprising a propylene homopolymer or a propylene-olefin copolymer comprising at least 50 wt % of propylene polymerization units and having an intrinsic viscosity ($\eta_b$) measured in tetralin at 135° C. of 0.2 to 10 dl/g is generated, thereby obtaining a polymer comprising as main components:

0.01 to 5 parts by weight of the olefin (co)polymer (a) having an intrinsic viscosity ($\eta_a$) measured in tetralin at 135° C. of 15 to 100 dl/g; and 100 parts by weight of the olefin (co)polymer (b) having an intrinsic viscosity ($\eta_b$) measured in tetralin at 135° C. of 0.2 to 10 dl/g:

compound (A): a transition metal compound having at least one π electron conjugated ligand; and compound (B): at least one compound selected from the group consisting of (B-1) aluminoxane, (B-2) an ionic compound that reacts with the transition metal compound (A) so as to form an ionic complex, and (B-3) a Lewis acid.

7. The preactivated catalyst for olefin (co)polymerization according to claim 1, further comprising a compound (C): an organic aluminum compound, in addition to the compounds (A) and (B).

8. The preactivated catalyst for olefin (co)polymerization according to claim 1, wherein the olefin (co)polymer (aa) is a propylene homopolymer or a propylene-olefin copolymer comprising at least 50 wt % of propylene polymerization units, the olefin (co)polymer (a) is an ethylene homopolymer or an ethylene-olefin copolymer comprising at least 50 wt % of ethylene polymerization units, and the preactivated catalyst is a preactivated catalyst for propylene (co)polymerization.

9. The catalyst for olefin (co)polymerization according to claim 2, wherein the preactivated catalyst (1) further comprises a compound (C): an organic aluminum compound, in addition to the compounds (A) and (B).

10. The catalyst for olefin (co)polymerization according to claim 2, wherein the olefin (co)polymer (aa) is a propylene homopolymer or a propylene-olefin copolymer comprising at least 50 wt % of propylene polymerization units, the olefin (co)polymer (a) is an ethylene homopolymer or an ethylene-olefin copolymer comprising at least 50 wt % of ethylene polymerization units, and the catalyst is a catalyst for propylene (co)polymerization.

11. The olefin (co)polymer composition according to claim 3, wherein the polymerization catalyst further comprises a compound (C): an organic aluminum compound, in addition to the compounds (A) and (B).

12. The olefin (co)polymer composition according to claim 3, which has a melt tension (MS) at 230° C. and a melt flow index (MFR) measured under a load of 21.18N at 230° C. that satisfy the following inequality:

$$\log (MS) > -1.28 \times \log (MFR) + 0.44.$$

13. The method for producing an olefin (co)polymer composition according to claim 4, wherein the preactivated catalyst further comprises a compound (C): an organic aluminum compound, in addition to the compounds (A) and (B).

14. The method for producing an olefin (co)polymer composition according to claim 5, wherein the preactivated catalyst (1) further comprises a compound (C): an organic aluminum compound, in addition to the compounds (A) and((B).

15. The method for producing an olefin (co)polymer composition according to claim 6, wherein the polymerization catalyst further comprises a compound (C): an organic aluminum compound, in addition to the compounds (A) and (B).

16. The method for producing an olefin (co)polymer composition according to claim 6, wherein olefins are (co) polymerized with the preactivated catalyst additionally comprising at least one compound selected from the group consisting of the following compounds (B) and (C):

compound (B): at least one compound selected from the group consisting of (B-1) aluminoxane, (B-2) an ionic compound that reacts with the transition metal compound (A) so as to form an ionic complex, and (B-3) a Lewis acid; and compound (C): an organic aluminum compound.

17. The method for producing an olefin (co)polymer composition according to any one of claims 4, 5 and 6, wherein the obtained olefin (co)polymer composition has a melt tension (MS) at 230° C. and a melt flow index (MFR) measured under a load of 21.18N at 230° C. that satisfy the following inequality:

$$\log (MS) > -1.28 \times \log (MFR) + 0.44.$$

18. The method for producing an olefin (co)polymer composition according to any one of claims 4, 5 and 6, comprising the step of performing an additional preactivation treatment wherein olefins are (co)polymerize so that an olefin (co)polymer (aa) having an intrinsic viscosity [$\eta_{aa}$] lower than the intrinsic viscosity [$\eta_a$] of the olefin (co) polymer (a)generated in the preactivation treatment is generated in an amount of 1 g to 50 kg per mmol of transition metal in a compound (A), before or before and after the generation of the olefin (co)polymer (a).

19. The method for producing an olefin (co)polymer composition according to any one of claims 4, 5 and 6, wherein the olefin (co)polymer (aa) is a propylene homopolymer or a propylene-olefin copolymer comprising at least 50 wt % of propylene polymerization units.

* * * * *